Figure 1:
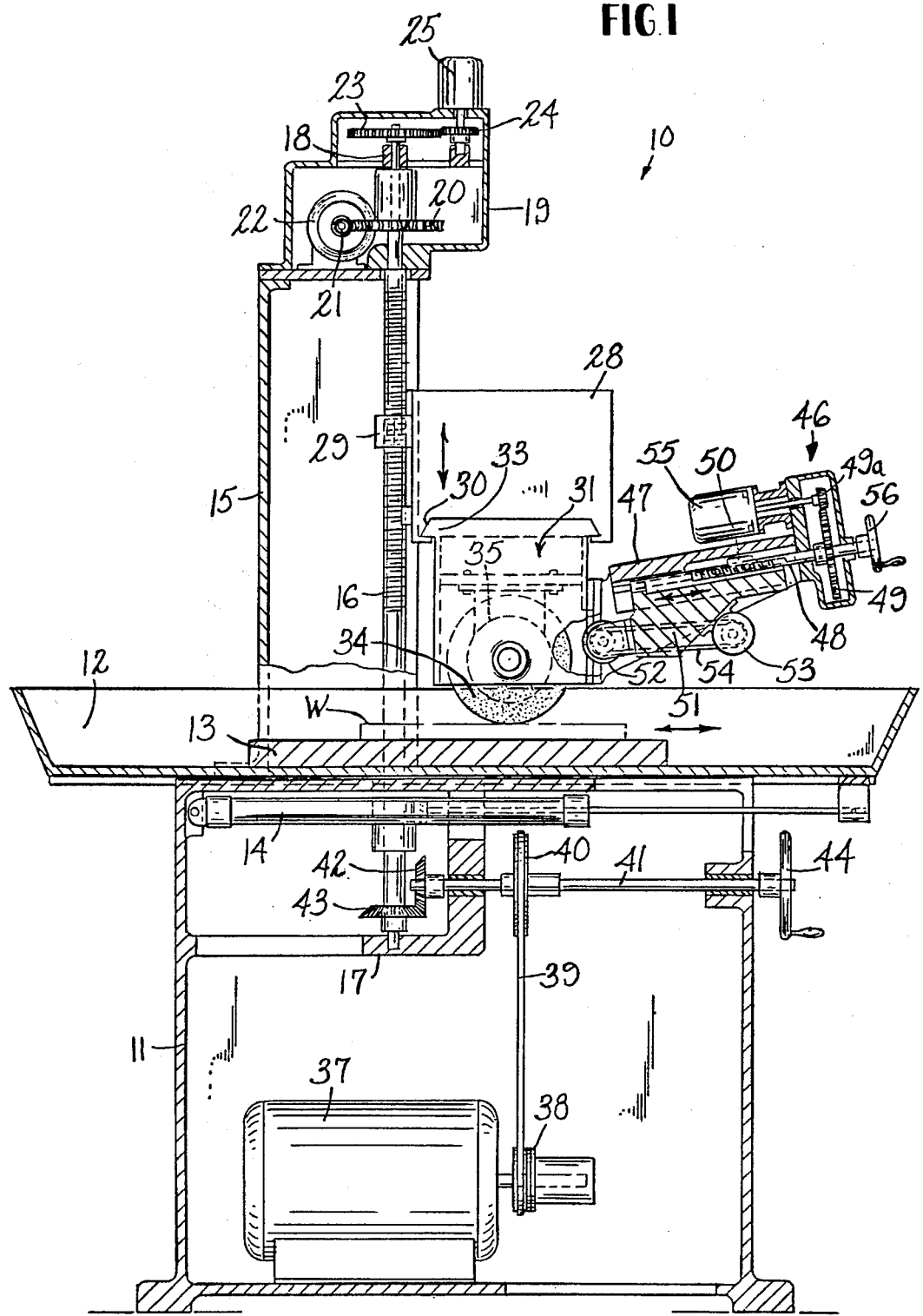

United States Patent [19]

Grieb et al.

[11] 3,965,621
[45] June 29, 1976

[54] CONTROL SYSTEM FOR GRINDING MACHINE
[75] Inventors: Paul E. Grieb, Plantsville, Conn.; Richard Sieradzki, Troy, Mich.
[73] Assignee: Textron, Inc., Providence, R.I.
[22] Filed: Nov. 7, 1974
[21] Appl. No.: 521,630

Related U.S. Application Data
[62] Division of Ser. No. 317,229, Dec. 21, 1972, Pat. No. 3,859,760.

[52] U.S. Cl. .......................... 51/165.71; 51/165.77; 51/165.87
[51] Int. Cl.² ....................................... B24B 49/18
[58] Field of Search .................... 318/603, 605, 608; 51/165 R, 165.77, 165.71, 165.87, 165.88

[56] References Cited
UNITED STATES PATENTS

| | | | |
|---|---|---|---|
| 2,521,821 | 12/1950 | Bockisch | 51/165 R X |
| 3,157,969 | 11/1964 | Fant | 51/165.87 |
| 3,193,976 | 7/1965 | Luebkemann | 51/165 R |
| 3,622,287 | 11/1971 | Nagoya | 51/165 R |
| 3,643,146 | 2/1972 | Ferguson | 318/603 X |
| 3,686,547 | 8/1972 | Kelling | 318/603 X |
| 3,691,357 | 9/1972 | McIntosh | 51/165.71 |
| 3,822,512 | 7/1974 | Mercer | 51/165.87 |

Primary Examiner—Harold D. Whitehead
Attorney, Agent, or Firm—DeLio and Montgomery

[57] ABSTRACT

This disclosure relates to a system which continuously monitors and displays the distance between the cutting edge of a grinding wheel and a lower reference plane. A finish size of a workpiece may be set into the system and the grinding wheel is downfed in predetermined increments until the monitor distance equals the selected finish size.

5 Claims, 2 Drawing Figures

CONTROL SYSTEM FOR GRINDING MACHINE

This application is a division of co-pending application Ser. No. 317,229 filed Dec. 21, 1972, now U.S. Pat. No. 3,859,760.

This invention relates to grinding machines and more particularly relates to surface grinders and control of the position thereof with respect to a reference plane.

The present invention provides a new and improved system for controlling the downfeed of the wheelhead of a surface grinder while continuously monitoring and displaying the position of the cutting surface of the wheel above a reference plane. The system further provides logic means for setting a desired finish distance of the cutting surface of the grinding wheel above a reference plane and comparison with the continuously monitored position so that when the two positions are equal the downfeed of the grinding wheel is halted. The invention further provides for adjusting the continuously stored position of the cutting surface of the grinding wheel in accordance with any diameter change which occurs during a wheel dressing or trueing operation.

Briefly stated, the invention in one form thereof utilizes a synchro-resolver coupled to the elevation lead screw and a resolver signal is phase compared to a follow-up signal. Any difference in phase causes pulses to be generated to advance or retard the phase of the follow-up signal, to match the phase of the resolver signal. Each of the generated pulses corresponds to a predetermined dimensional movement and are produced in accordance with the phase difference. The resolver is geared to the wheelhead elevation screw in a ratio which makes each rotation thereof equivalent to a predetermined linear amount of travel of the wheelhead. The generated pulses which indicate the magnitude of the phase difference and the direction thereof are accumulated by a reversible counter which provides a continuous display of position readout. A comparator which may be in the form of a subtractor has a predetermined dimension set therein representing the finish size of a workpiece. This finish size is compared to the continuous position of the grinding wheel during a down feeding and cutting operation until the continuous position is equal to the selected finish size.

A wheel dressing operation may be performed at any time and the visual display is automatically incremental in accordance with the diameter reduction of the grinding wheel.

An object of this invention is to provide a new and improved control system for a surface grinding machine.

Another object of this invention is to provide a new and improved system for continuously monitoring and visually displaying the distance between the cutting surface of the grinding wheel and a reference plane.

A further object of this invention is to provide a distance monitoring system for a surface grinding machine having new and improved means for incrementing or decrementing the monitored distance in accordance with grinding wheel diameter decrease without changing the position or status of position transducing elements.

A further object of this invention is to provide a system of the type described where the monitored position may be manually incremented or decremented to compensate for minor changes in machine parameters during operation thereof.

Figure 2:
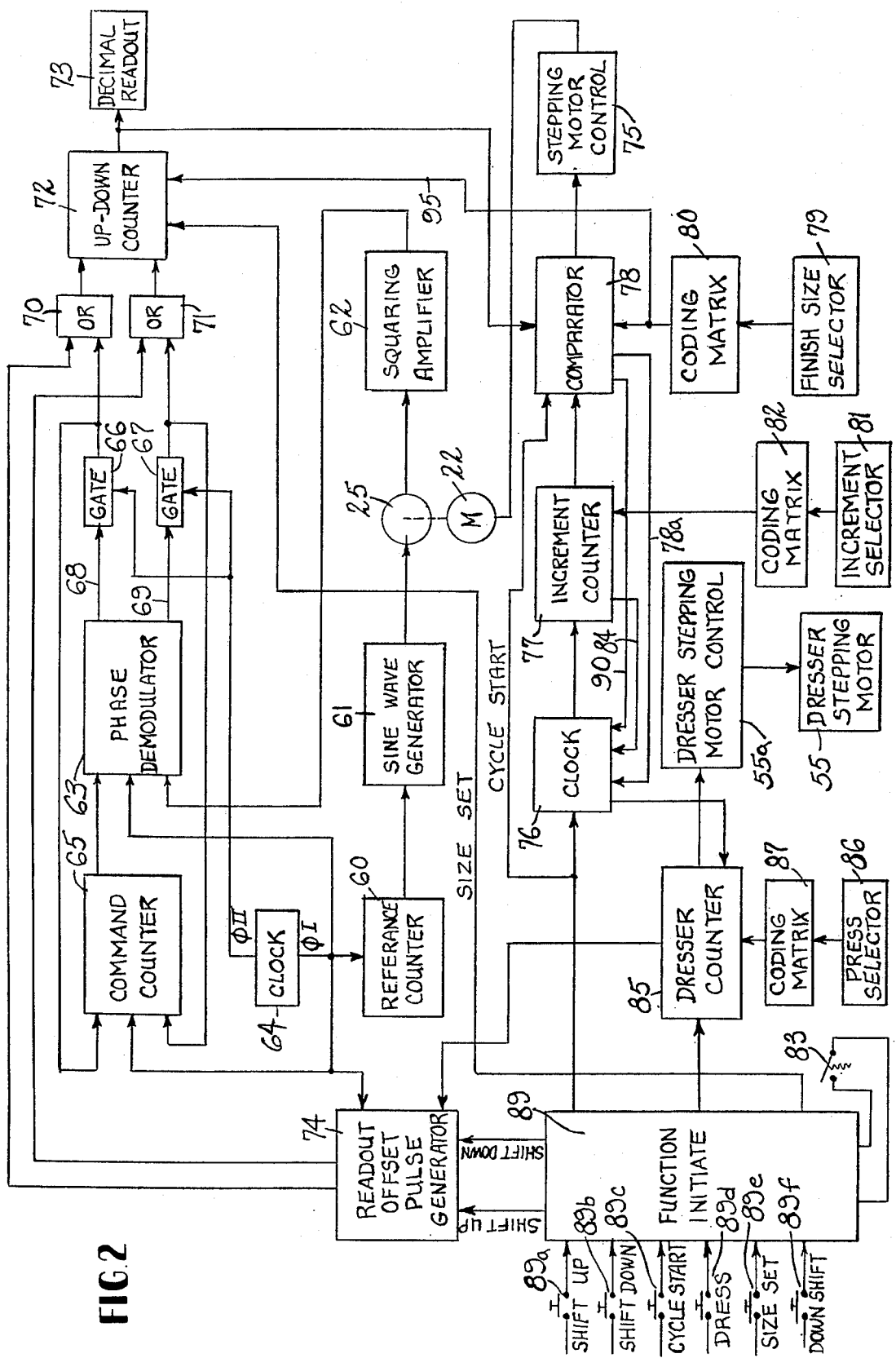

The features of the invention which are believed to be novel are particularly pointed out and distinctly claimed in the concluding portion of this specification. However, the invention both as to its operation and organization, together with further objects and advantages thereof may best be appreciated by reference to the following detailed description taken in conjunction with the drawings, wherein:

FIG. 1 is an elevation in section of a grinding machine which may embody the invention; and FIG. 2 is a schematic block diagram of a system embodying the invention.

A surface grinder 10 embodying the invention includes a base member 11, with a table 12 movable thereon. Table 12 has a work-supporting member 13 thereon adapted to support a workpiece W to be ground. Member 13 is conveniently a magnetic chuck and the upper surface thereof provides a reference plane for movement and gaging purposes. Table 12 is reciprocably movable on base 11 through one or more fluid actuated cylinders 14. Table 12 reciprocates between limits of travel to move a workpiece W beneath a grinding wheel. Also supported on base 11 is a column 15, through which extends an elevation lead screw 16 having its lower end journaled in a support portion 17 of base 11. The upper end of shaft 17 is journaled in a support 18 on an upper housing member on column 15. Shaft 16 carries a gear 20 thereon adapted to be driven through pinion 21 on a stepping motor 22. The upper end of the shaft is further connected through gears 23 and 24 to a synchroresolver 25.

The grinder 10 further comprises a wheelhead support 28 having a traveling nut 29 thereon threadably engaging lead screw 16 so that upon rotation of screw 16 the wheelhead support 28 will move vertically. Support 28 moves in conventional guides or ways on column 15. Support 28 will further include a dovetail way 30. A wheelhead 31 is movable in support 28 transversely of table 12. Wheelhead 31 is movable in horizontal direction across table 12 by means of a dovetail gib 33 received in way 30. Wheelhead 31 includes a grinding wheel 34 driven about a horizontal axis by a motor 35.

Carriage 28 may also be moved vertically by driving lead screw 16 from a fast traverse motor 37, a pulley 38, belt 39, pulley 40 on shaft 41 and beveled gears 42 and 43. Shaft 41 may also be turned through provision of a hand wheel 44. Conventional clutches (not shown) are provided to disconnect the various drive means for lead screw 16 when a different one is operated.

A dresser assembly 46 is carried on the wheelhead and comprises a housing member 47 having a lead screw 48 therein. Lead screw 48 receives a traveling nut 50 on a dresser carrier 51. Carrier 51 moves on cooperating guides 50a between housing 47 and carrier 51. The dresser carrier 51 rotatably mounts a dresser wheel 52 driven from a motor 53 by a belt 54. Lead screw 48 includes a gear 49 thereon in engagement with a gear 49a on the shaft of a stepping motor 55. A hand wheel 56 is also provided for manual operation of lead screw 48. Through operation of lead screw 48 the dresser wheel 52 is moved into dressing engagement with grinding wheel 34. Dressing wheel 52 moves in a path which includes a line through the axis of rotation of both wheel 31 and dresser 52 so that dresser 52 always contacts wheel 31 along the same diameter taken with respect to a reference plane.

The invention provides new and improved means for continuously monitoring the position of the cutting edge of the grinding wheel with respect to the reference plane defined by the top surface of workpiece holder or chuck.

The resolver 25 is utilized to measure vertical movement of wheelhead 31 on lead screw 16 and continuously monitor the distance between the cutting edge of wheel 34 and the reference plane. The resolver with an associated squaring amplifier provides a square wave pulse train which is phase shifted with respect to a reference square wave upon rotation of the resolver. The output waveform of the resolver is phase dependent upon the position of the rotor with respect to the stator winding.

The resolver 25 receives a sine wave from a sine wave generator derived from a reference square wave of a low frequency, for example, 1 Khz. A reference counter 60 supplies a 1 Khz square wave to a sine wave generator 61, and the resulting sine wave is applied to resolver 25. The phase shifted output voltage of resolver 25 is applied to a squaring amplifier 62 and reconverted to a 1 Khz square wave. The squared or shaped resolver signal is then applied to a phase demodulator 63.

A clock generator 64 supplies bi-phase clock signals ΦI and ΦII at a high frequency such as 1 Mhz. The ΦI and ΦII clock pulses are 180° out of phase for reasons hereinafter made apparent. The reference counter 60 is, in essence, a 1/1000 divider and the reference square wave is tied to the clock. The frequencies stated herein are set forth only for purposes of explanation.

The same phase of the clock is applied to a command counter 65 which is also a 1/1000 divider to derive another 1 Khz square wave. Both low frequency square waves are applied to phase demodulator 63, together with clock phase I. Phase modulator 63 will provide two outputs at ΦI clock time dependent on the phase difference between the low frequency square waves and the relative direction of the phase difference.

Demodulator 63 measures the time duration of the phase difference and transmits clock pulses during this time duration to either of gates 66 and 67 over lines 68 and 69, respectively. Gates 66 and 67 provide outputs at ΦII clock pulse time in clock pulse frequency. The gates 66 and 67 may conveniently include flip-flops which provide an output after being reset by ΦII pulses, if previously set by ΦI pulses from demodulator 63.

The output pulses of gates 66 and 67 are fed back to an input of command counter 65 as incrementing and decrementing pulses, respectively. This will advance or retard the phase of the command counter square wave to act to correct any phase error existing between the command square wave and the resolver square wave.

The phase change of the resolver output with respect to the reference square wave will be 360° for one complete rotation of the resolver. In the given numerical examples, this would permit one thousand clock pulses at a 1 Mhz frequency to be passed by the phase demodulator. These pulses would then be fed back to the command counter as previously explained.

Therefore, each pulse corresponds to a phase change of 0.36°. The resolver is so geared to set screw 16 that each pulse is equivalent to 0.001 inches of movement of the wheelhead.

The incrementing and decrementing pulse outputs of gates 66 and 67 are applied through OR gates 70 and 71, respectively, to a counter 72. The counter 72 accumulates the pulses representing each 0.0001 inches of travel of the wheelhead and at any instant of time the count therein represents the distance between the cutting edge of the grinding wheel and the reference plane. The numerical distance in counter 72 may be continuously observed by a decimal readout device 73.

The OR gates 70 and 71 are provided to permit corrective pulses to be applied to counter 72 from an offset pulse generator 74. These corrective pulses are applied at ΦI clock time to compensate for decrease in grinding wheel diameter due to wheel trueing or dressing, and other purposes hereinafter described.

Wheelhead stepping motor 22 is driven through a motor control 75. Control 75 receives pulses from a clock 76 through an increment counter 77 and a comparator. Comparator 78 which may conveniently be a subtractor, compares a dimension set therein by a size set selector 79 and encoded by a coding matrix 80 with the dimension in counter 72. When the difference is zero, a disabling signal is applied over line 78a to clock 76. A downfeed increment is set in counter 77 through an increment selector 81 and coding matrix 82. Increment counter 77 counts a predetermined number of pulses from clock 76 representative of a preset downfeed and passes such pulses when a position sensing device such as a limit switch 83 is closed at the end of a grinding pass. One or more limit switches 83 may be positioned to sense each end of travel of table 12.

When switch 83 is closed counter 77 will pass a preset number of pulses and thereafter apply a disabling signal to clock 76 over line 84 until switch 83 again senses a predetermined position of table 12.

Clock 76 also applies pulses to dresser stepping motor 55 where a dressing operation is called for. The amount of dress is set into a dresser counter 85 through a dress dimension selector 86 and an associated coding matrix 87. When a dressing function is called for, dresser counter 85 will permit a number of pulses corresponding to the dressing dimension to pass from clock 76 to dresser stepping motor control 55a. The stepping motor controls are conventional controls which convert a pulse a given value to the signal level required to operate the stepping motors.

The counters 77 and 85 may comprise a binary coded decimal (B.C.D.) counter, and a gate which is disabled when the counted pulses reach the preset valve. The selectors 79, 81 and 86 preferably comprise thumb wheel actuated switches which are set to desired decimal values. The coding matrices are conventional diode encoding matrices which convert the decimal values to binary B.C.D. form.

A function initiate control 89 comprises a plurality of monopulse generators which may be in the form of one shot multi-vibrators. When a corresponding function switch 89a–89f is closed, a pulse is generated and forwarded to an appropriate circuit to enable such circuit. The various circuits such as clock 76, counters 77, 85, and comparators will include an enabling flip-flop which acts as an ON-OFF switch in response to an enable pulse from function initiate control 89.

A typical cycle of operation might be as follows, assuming that the machine is to be initially started up at the beginning of the day at the start of a work period. A test piece of any size or material is placed on reference plane defined by chuck 13. The wheelhead is then lowered by stepping motor 22, traverse motor 37 or hand wheel 44 until the piece is sparked with the grinding wheel. At this point the machine is stopped and the piece is measured. Assume that the test piece measures 0.5775 inches in thickness after grinding. This size is then set on finish size selector 79. Size set switch 89e is closed and a signal is applied to a gate in counter 72 to read this size into counter 72 over line 95. The grinding wheel position will immediately visually appear on decimal readout 73.

Any further movement of the grinding wheel from this point will register automatically on the readout by the resolver-servo system previously described. The system as now set has been compensated for minor system corrections due to dresser wear, temperature changes, etc.

The workpiece to be finished is now inserted onto the chuck 13. Assume that this piece is to be ground to 0.5720 inches from 0.5775 inches in increments of 0.0005 inches per pass. Increment selector is then set to 0.0005 inches and the wheelhead will be downfed this amount after each pass on the workpiece.

At this point the cycle start switch 89c is depressed which will enable clock 76 when a limit of travel of table 12 is reached. Assuming that switch 83 is closed increment counter 77 will pass five clock pulses from clock 76 each representative of 0.0001 inches through comparator 78 to stepping motor control 75. This increment of downfeed will occur every pass thereafter. This movement of the grinding wheelhead will be processed in the resolver-servo system as previously described and the actual position of the wheel will be continuously visually displayed on readout 73.

If at any time during this operation it is desired to dress the wheel, the dress increment in units of ten thousandths of an inch may be set from dress selector 86 into dresser counter 85. Upon closing of dress switch 89e dresser counter 85 will permit the desired number of pulses to be applied to the dresser stepping motor control and dresser stepping motor 55 will move dresser 52 the desired increments into wheel 34, thus reducing the radius thereof until dresser counter 85 counts the preset number of pulses corresponding to the dressing dimension. Simultaneously therewith the dressing clock pulses are applied to readout offset pulses generator 74 together with ΦI clock pulses. The dresser counter pulses will gate the ΦI clock pulses through OR gate 70, and increment counter 72 corresponding to the dressing or trueing of wheel 34. The counter 72 and hence the decimal readout is immediately updated without any movement of resolver 25 for such purpose.

Thereafter, the downfeed will continue at the end of each pass at the preset downfeed increments.

When the downfeed position as monitored by counter 72 reaches the number set in comparator 78 a signal is applied over line 78a to disable clock 76. Thereafter, a predetermined number of spark-out passes may be made.

The finish size for the automatic downfeed can be changed at any time simply by resetting the finish size selector 79.

For any minor system corrections throughout a work period position corrections may be made in counter 72 through readout offset pulse generator 74 by closing switches 89a or 89b. Each time one of the switches 89a or 89b is closed it will gate a ΦI clock pulse through readout offset pulse generator 74 to either incrementing gate 70 or decrementing gate 71. The readout offset pulse generator 74 may conveniently comprise flip-flops which will enable a coincident gate when set and thereafter be reset by the pulse passed by the gate to the OR gates 70 or 71.

The clock 76 which supplies the command pulses to the stepping motors through the stepping motor controls operates at a relatively low frequency of 40 pulses per second and each pulse thereof is representative of 0.0001 inches of travel of the wheelhead or the dresser.

Numerical examples have been given throughout to aid the description of the operation of the device. However, it will be understood that such numerical examples are merely illustrative and the system may be calibrated for other frequencies and ratios of pulse to linear travel increments.

The comparator 78 is further constructed such that when the remaining distance to be downfed reaches a predetermined distance from the finish size, further downfeed on that incremental downfeed is halted. Then the final downfeed increment will always be the same amount regardless of the downfeed increment set on selector 81. For example, the subtractor comprising comparator 78 will sense when the difference between the selected finish size and the actual position is 0.0001 inches, and will apply a temporary disabling signal to clock 76 over line 90. Thereafter, on the next downfeed only one pulse will be passed through comparator 78 to the stepping motor control 75.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments and modifications which do not depart from the spirit and scope of the invention.

What is claimed is:

1. A surface grinder comprising a wheelhead arranged to drive a grinding wheel, means defining a reference plane, means including a pulse responsive motor for moving said wheelhead and wheel in elevation above the reference plane, a source of motor drive pulses, means providing a first train of pulses, resolver means coupled to said means for generating a second train of pulses at the same frequency as said first train, means for comparing the phase difference of the pulses of said first and second trains, means for providing a third train of pulses at a frequency substantially higher than pulses of said first and second trains proportional in number to the magnitude of the phase difference between pulses of said first and second trains and one direction of phase difference, and providing a fourth train of pulses of the same frequency as said third train proportional in magnitude to the magnitude of the phase difference between pulses of said first and second trains and the other direction of phase difference, pulse counting means for accumulating the difference in the number of the pulses of said third and fourth trains and establishing a numerical representation thereof, each of the pulses of said third and fourth trains representing an increment of distance between the cutting surface of said wheel and said reference plane, means for visually displaying the distance represented in said counting means, a grinding wheel dresser adapted to be moved into contact with said grinding wheel and reduce the radius thereof, a second pulse responsive motor adapted to move said dresser into contact with said grinding wheel, means for applying motor drive pulses to said second motor, means for selecting a predetermined dressing dimension for said wheel and storing said dimension, dresser pulse counting means adapted to count pulses applied from said pulse source to said second motor and permit application of a number of pulses representative of a preselected dressing dimension to said second motor, and means responsive to application of drive pulses to said second motor for applying a number of pulses of one of said third and fourth pulse trains to said pulse counting means to modify the difference therein in accordance with the dressing dimension.

2. A surface grinder comprising a wheelhead arranged to drive a grinding wheel, means defining a reference plane and adapted to support a workpiece thereon, means for moving said wheelhead and wheel in elevation above a reference plane, means coupled to said means for moving for continuously monitoring and storing the dimension between the cutting edge of said wheel and said reference plane, means responsive to said means for monitoring for providing a visual display of the dimension, wheel dressing means movable into engagement with said wheel to dress said wheel by a preselected radial dimension, means for moving said dressing means, means for selecting a predetermined dressing dimension, means for actuating said means for moving to cause said dressing means to dress said wheel by the predetermined dimension, and means responsive to movement of said dressing means for incrementing the dimension in said monitoring means whereby said display providing means displays the new dimension between the reference plane and the cutting surface of said grinding wheel.

3. The device of claim 2 further including means for incrementing and decrementing said monitoring and storing means independent of said means for moving.

4. The device of claim 2 wherein means are provided for producing pulses proportional in number to movement of said wheel in elevation, said monitoring and storing means is a bi-directional pulse counting means, said pulse counting means is incremented by pulses produced proportional to movement of said dressing means during a dressing operation.

5. The device of claim 4 further including means operable independent of said means for moving and said dressing means for incrementing and decrementing said counting means.

* * * * *